(12) United States Patent
Kilgriff

(10) Patent No.: US 10,308,304 B2
(45) Date of Patent: Jun. 4, 2019

(54) ARM REST ASSEMBLY FOR A MOTORCYCLE AND METHODS THEREFOR

(71) Applicant: Kuryakyn Holdings, LLC, Somerset, WI (US)

(72) Inventor: Thomas Kilgriff, Scandia, MN (US)

(73) Assignee: KURYAKYN HOLDINGS, LLC, Somerset, WI (US)

( * ) Notice: Subject to any disclaimer, the term of this patent is extended or adjusted under 35 U.S.C. 154(b) by 135 days.

(21) Appl. No.: 15/646,588

(22) Filed: Jul. 11, 2017

(65) Prior Publication Data
US 2019/0016403 A1    Jan. 17, 2019

(51) Int. Cl.
*B62J 1/28*    (2006.01)

(52) U.S. Cl.
CPC ...................................... *B62J 1/28* (2013.01)

(58) Field of Classification Search
CPC ........................................................ B62J 1/28
USPC ............... 297/411.36, 411.31, 411.32, 411.3, 297/411.35
See application file for complete search history.

(56) References Cited

U.S. PATENT DOCUMENTS

| | | | | |
|---|---|---|---|---|
| 3,612,606 A | * | 10/1971 | Swenson | A47C 7/543 297/396 |
| 3,829,159 A | * | 8/1974 | Leffler | A47C 7/543 297/411.31 |
| 4,225,183 A | * | 9/1980 | Hanagan | B62J 1/12 297/243 |
| 6,419,323 B1 | * | 7/2002 | Chu | A47C 1/03 297/411.35 |
| 2004/0227388 A1 | * | 11/2004 | Wang | A47C 1/03 297/411.35 |
| 2008/0093908 A1 | * | 4/2008 | Cooley | B60N 2/753 297/411.3 |
| 2011/0074188 A1 | * | 3/2011 | Freer | B60N 2/753 297/188.14 |
| 2012/0205957 A1 | * | 8/2012 | Lindloff | B62J 1/28 297/411.2 |
| 2015/0217663 A1 | * | 8/2015 | Parvey | B62J 1/28 297/411.3 |
| 2018/0057109 A1 | * | 3/2018 | Kamiyama | B62J 1/02 |

* cited by examiner

*Primary Examiner* — Mark R Wendell
(74) *Attorney, Agent, or Firm* — Barnes & Thornburg LLP

(57) ABSTRACT

An arm rest assembly for a motorcycle is provided having a housing that receives a shaft of the arm rest. A user-operated button is movable between a first position to prevent vertical movement of the support relative to the housing, and a second position to permit vertical movement of the support. A locking mechanism is operable to secure a second sleeve of the assembly to a first sleeve of the assembly to prevent relative movement between the first sleeve and the second sleeve.

20 Claims, 10 Drawing Sheets

ARM REST ASSEMBLY FOR A MOTORCYCLE AND METHODS THEREFOR

TECHNICAL FIELD

The present disclosure relates generally to an arm rest assembly for a passenger seat of a motorcycle, and more particularly to an adjustable arm rest assembly that is capable of rotating and moving vertically.

BACKGROUND

Passenger arm rest assemblies may be mounted on a back seat of a motorcycle. Generally, arm rest assemblies are coupled to a frame of the passenger seat and extend outward toward a front of the motorcycle. The arm rest may be designed to rotate about an axis to provide comfort to the passenger. Additionally, the arm rest may be designed to raise or lower vertically to provide additional comfort to the passenger. Typically, the arm rest should be secured in such a manner as to prevent unwanted rotation or vertical movement; as such movement may be dangerous, particularly when the motorcycle is in operation.

SUMMARY

An arm rest assembly for a motorcycle is shown and described. The assembly includes a number of components configured to be rotated or vertically adjusted to rotate and vertically adjust a support of the arm rest. A method or technique for operating the arm rest is also disclosed.

According to one aspect of the disclosure, an arm rest assembly for a motorcycle includes a support including an elongated body sized to receive an arm of a passenger. A shaft extends downwardly from the elongated body. A plurality of annular slots is defined in the shaft. A housing includes a bore sized to receive the shaft. A user-operated button is positioned in the housing. The user-operated button is movable between a first position in which the button is received in a first annular slot of the plurality of annular slots to prevent vertical movement of the support relative to the housing, and a second position in which the button is spaced apart from the first annular slot to permit vertical movement of the support. A first sleeve is secured to the housing. The first sleeve has a first passageway extending along a longitudinal axis and sized to receive the elongated shaft. A second sleeve includes a body that is pivotally coupled to the housing and a second passageway that is defined in the body and is sized to receive the elongated shaft. A locking mechanism is operable to secure the second sleeve to the first sleeve to prevent relative movement between the first sleeve and the second sleeve. The locking mechanism includes a groove defined in the first sleeve and a peg extending from the body of the second sleeve that is sized to be received in the groove.

In some embodiments, the groove may be a plurality of grooves positioned circumferentially around the first passageway of the first sleeve. The peg may be a plurality of pegs positioned circumferentially around the second passageway of the second sleeve. Each peg may be sized to be received in one of the plurality of grooves to prevent relative movement between the first sleeve and the second sleeve. In some embodiments, a concave curved surface may define each groove of the plurality of grooves of the first sleeve. Each peg of the second sleeve may have a convex curved surface. In some embodiments, the locking mechanism may have a biasing element positioned between the second sleeve and the housing to bias the second sleeve into engagement with the first sleeve such that the peg is positioned in the groove.

In some embodiments, the shaft may have a hexagonal outer wall. The second sleeve may have a hexagonal inner wall shaped to match the hexagonal outer wall of the shaft. In some embodiments, the user-operated button may have a cap positioned in the housing and sized to be received in each annular slot of the shaft. A rod may have a first end connected to the cap and a second end positioned outside of the housing. In some embodiments, a biasing element may bias the user-operated button in the first position. In some embodiments, the user-operated button may be moveable along an axis extending orthogonal to the longitudinal axis of the first sleeve. In some embodiments, the cap may have a cylindrical outer surface. The shaft may have a concave curved surface defining each annular slot of the plurality of annular slots.

In some embodiments, a bracket may be configured to be coupled to the motorcycle. The housing may be secured to a distal end of the bracket. In some embodiments, the shaft includes only three annular slots.

According to another aspect of the disclosure, an arm rest assembly for a motorcycle includes a support having an elongated body sized to receive an arm of a passenger. A shaft extends downwardly from the elongated body. A housing includes a bore sized to receive the shaft. A first sleeve is secured to the housing. The first sleeve has a first passageway extending along a longitudinal axis and sized to receive the elongated shaft. A second sleeve includes a body that is pivotally coupled to the housing and a second passageway that is defined in the body and is sized to receive the elongated shaft. A locking mechanism is operable to secure the second sleeve to the first sleeve to prevent relative movement between the first sleeve and the second sleeve. The locking mechanism includes a plurality of grooves positioned circumferentially around the first passageway of the first sleeve and a plurality of pegs positioned circumferentially around the second passageway of the second sleeve. Each peg is sized to be received in one of the plurality of grooves. A biasing element is positioned between the second sleeve and the housing to bias the second sleeve into engagement with the first sleeve such that the each peg is received in one of the plurality of grooves to prevent relative movement between the first sleeve and the second sleeve.

In some embodiments, a concave curved surface may define each groove of the plurality of grooves of the first sleeve. Each peg of the second sleeve may have a convex curved surface. In some embodiments, the shaft may have a hexagonal outer wall. The second sleeve may have a hexagonal inner wall shaped to match the hexagonal outer wall of the shaft.

In some embodiments, a plurality of annular slots may be defined in the shaft. A user-operated button may be positioned in the housing. The user-operated button may be movable between a first position in which the button is received in a first annular slot of the plurality of annular slots to prevent vertical movement of the support relative to the housing, and a second position in which the button is spaced apart from the first annular slot to permit vertical movement of the support. A biasing element may bias the user-operated button in the first position. In some embodiments, a cap may be positioned in the housing and sized to be received in each annular slot of the shaft. A rod may have a first end connected to the cap and a second end positioned outside of the housing. In some embodiments, the user-operated button may be moveable along an axis extending orthogonal to the longitudinal axis of the first sleeve.

According to yet another aspect of the disclosure, a method of operating an arm rest assembly includes biasing a user-operated button positioned within a housing of the armrest assembly to first position in which the button is received in a first annular slot of a plurality of annular slots of a shaft extending through a bore in the housing to prevent vertical movement of the shaft relative to the housing and a first sleeve secured to the housing and having a first passageway through which the shaft extends. The method may also include advancing the user operated button to a second position in which the button is spaced apart from the first annular slot to permit vertical movement of the shaft relative to the housing and the first sleeve. The method may also include expanding a biasing element to bias a second sleeve that is pivotally coupled to the housing and has a second passageway through which the shaft extends such that each of a peg of the second sleeve is received in a groove defined in the first sleeve to prevent relative movement between the first sleeve and the second sleeve. The method may also include contracting the biasing element to disengage the peg from the groove to allow relative movement between the first sleeve and the second sleeve, wherein shaft rotates with the second sleeve.

In some embodiments, the method may require advancing the user-operated button along an axis extending orthogonal to a longitudinal axis of the first sleeve. In some embodiments, the method may require biasing a convex curved surface of the peg into a concave surface of the groove.

BRIEF DESCRIPTION OF THE DRAWINGS

The detailed description particularly refers to the following figures, in which.

DETAILED DESCRIPTION OF THE DRAWINGS

Figure 1:
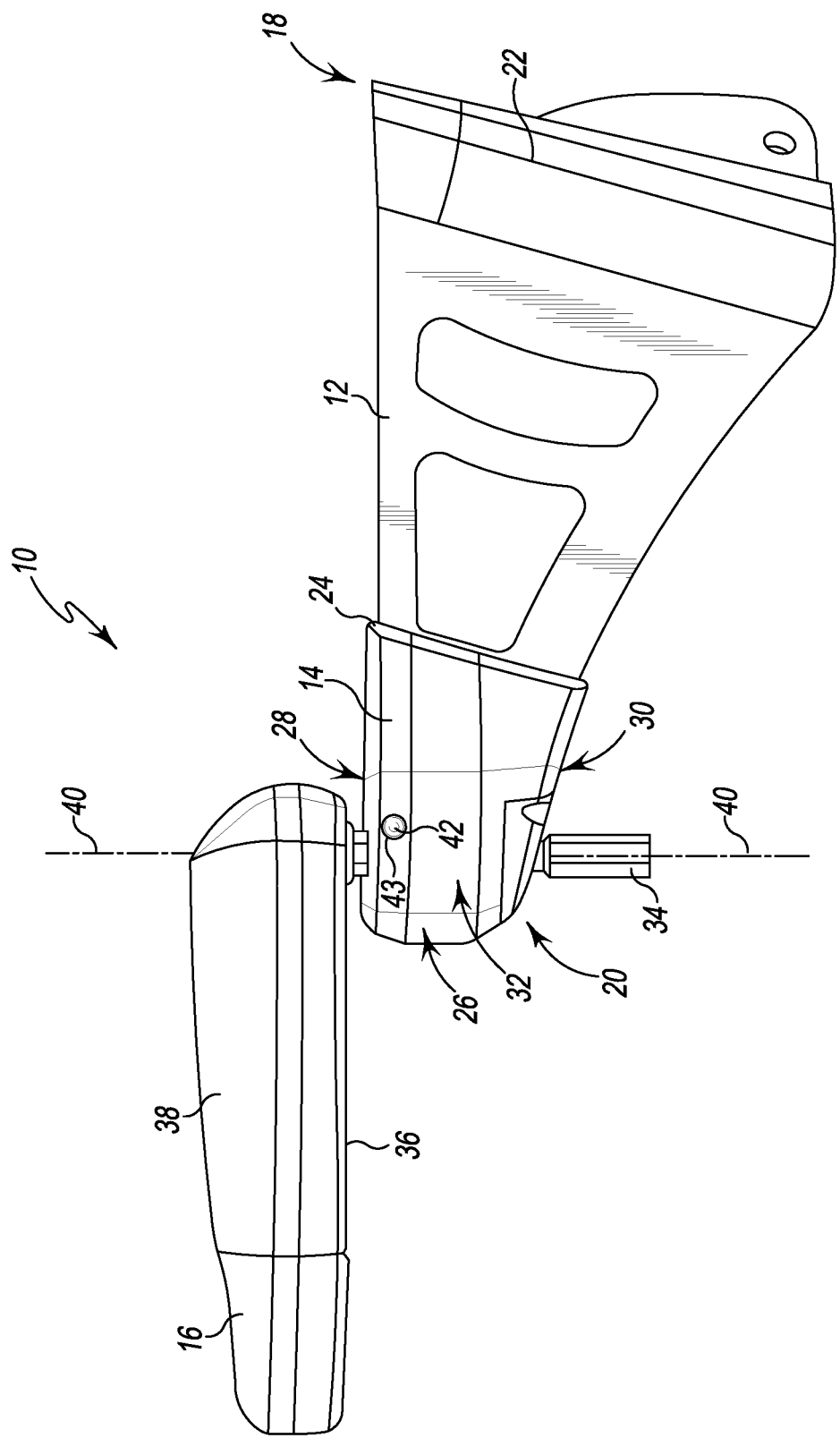
FIG. 1 is a front elevation view of an arm rest assembly in accordance with an embodiment.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 2:
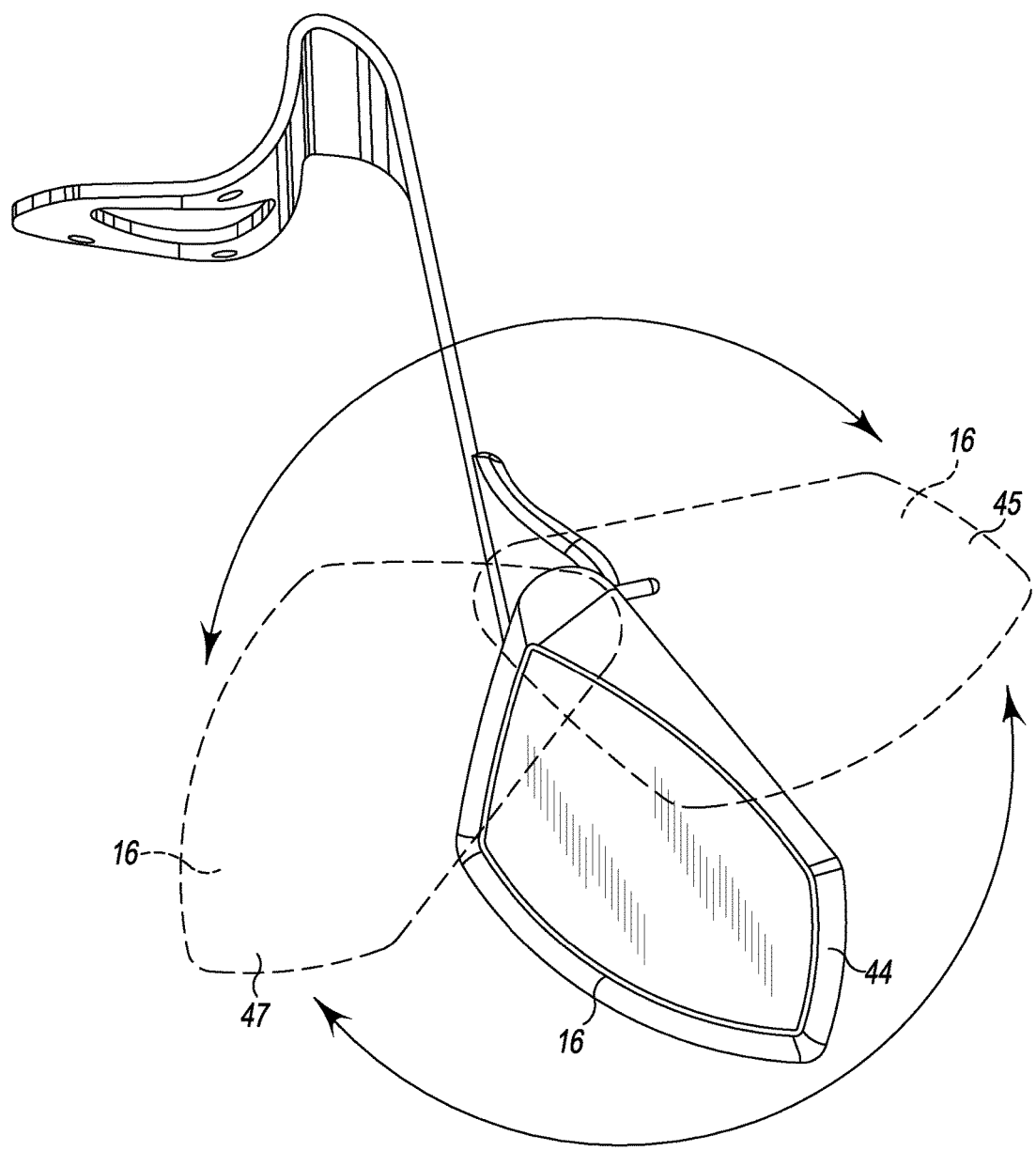
FIG. 2 is a top plan view of the arm rest assembly shown in FIG. 1 illustrating movement of the arm rest assembly in broken lines.

Referring to FIG. 1, an arm rest assembly 10 includes a bracket 12. The bracket 12 may be formed from a metal, plastic, or any other suitable material for attaching to a motorcycle. A housing 14 is secured to the bracket 12. An arm rest 16 is movably secured to the housing 14. The arm rest 16 includes a support 36 that includes a frame 37 and a padded surface 38, e.g. a foam pad, a silicon pad, a gel pad, or the like. As described in greater detail below, the arm rest 16 is configured to rotate 360 degrees and be locked in different angular positions with respect to the housing 14, as shown in FIG. 2. Referring to FIG. 2, the arm rest 16 rotates with respect to the housing about the axis 40. The shaft 34 rotates relative to the housing 14 about the axis 40, thereby rotating the support 36 of the arm rest 16. FIG. 2 illustrates three rotational positions of the arm rest 16 relative to the housing 14, wherein a first rotational position 44 is illustrated in solid lines and two other rotational positions 45 and 47 are illustrated in broken lines. It should be noted that the arm rest 16 may rotate to any number of rotational positions other than those illustrated in FIG. 2.

Referring back to FIG. 1, a locking mechanism (described below) locks the arm rest 16 in each of the different angular positions. The housing 14 also permits vertical adjustment of the arm rest 16 between different vertical positions. A user-operated button (described below) locks the arm rest 16 in each of the different vertical positions.

The bracket 12 extends between a proximal end 18 and a distal end 20. The proximal end 18 includes a curved flange 22 that is sized and shaped to be coupled to a passenger seat of a motorcycle (shown in FIG. 10). The curved flange 22 is sized and shaped to correspond to a back rest frame of the passenger seat. The curved flange 22 includes apertures through which a bolt, screw, or other fastener may be received to secure the bracket 12 to the frame of the passenger seat. It should be appreciated that in other embodiments the bracket 12 may be secured to the frame of the passenger seat via other fastening mechanisms.

The housing 14 is secured to the distal end 20 of the bracket 12. The housing 14 includes a proximal end 24 and a distal end 26. The housing 14 is secured to the bracket 12 such that the distal end 26 of the housing 14 is positioned proximate to the distal end 20 of the bracket 12. The housing includes a top surface 28 and an opposite bottom surface 30. A front surface 32 extends between the top surface 28 and the bottom surface 30. The front surface 32 has a substantially curved profile from the proximal end 24 to the distal end 26.

A shaft 34 extends from the arm rest 16 through the housing 14, through the top surface 28 of the housing 14 and the bottom surface 30 of the housing 14 along an axis 40. The shaft 34 is configured to raise and lower vertically along the axis 40. That is, the shaft 34 is configured raise and lower vertically with respect to the housing 14, thereby raising and lowering the arm rest 16 relative to the housing 14. A user-operated button 42 extends outward from the front surface 32 of the housing 14. An end 43 of the user-operated button 42 extends outward from the front surface 32 of the housing 14. As described in more detail below, the user-operated button is movable to release the shaft 34 for vertical movement relative to the housing 14.

Figure 3:
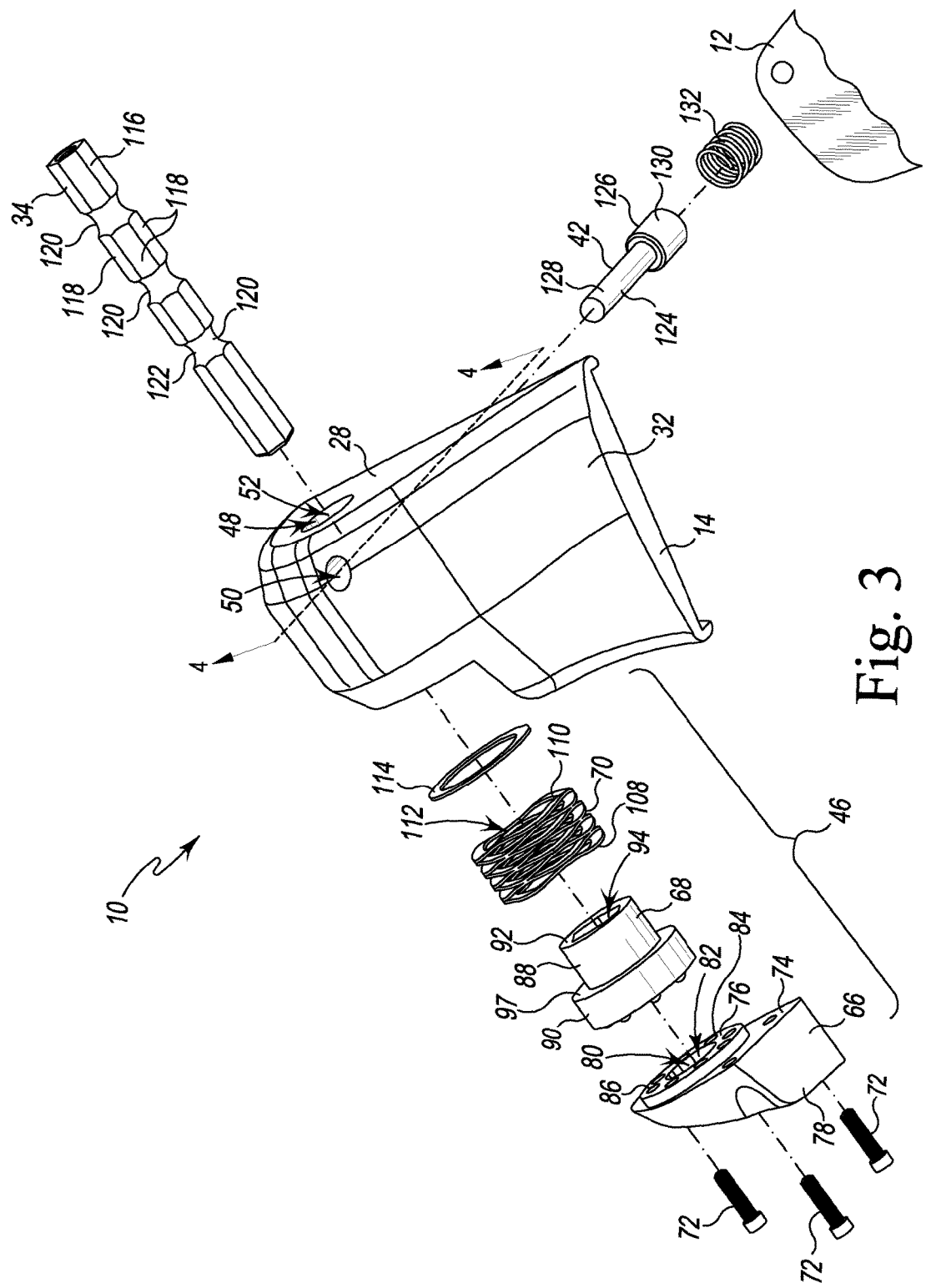
FIG. 3 is an exploded view of a housing, locking mechanism, shaft, user-operated button, and bracket of the arm rest assembly shown in FIG. 1.
Figure 4:
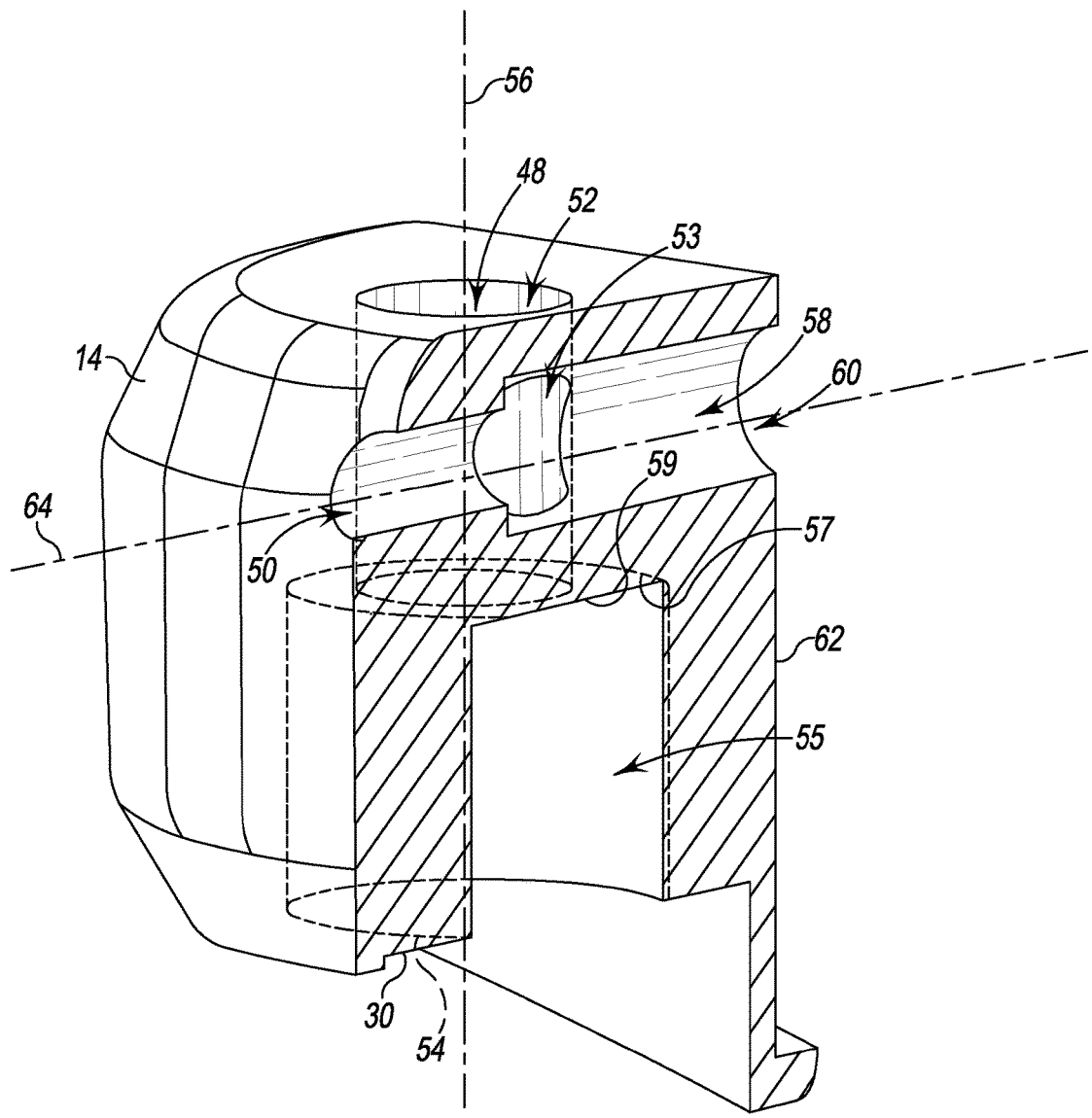
FIG. 4 is a cross-sectional perspective view of a housing of the arm rest assembly of FIGS. 1-3.

Referring to FIG. 3, an exploded view of the arm rest assembly 10 illustrates the housing 14. The housing 14 includes an opening 48 formed in the top surface 28. Additionally, an opening 50 is formed in the front surface 32. Referring to FIG. 4, the opening 48 forms part of a bore 52 that extends substantially vertically through the housing 14 to an opening 54 formed in the bottom surface 30 of the housing 14. The bore 52 includes an upper end 53 having a first diameter and a lower end 55 having a second diameter that is greater than the first diameter. The upper end 53 and the lower end 55 are separated by an inner flange 57 having a surface 59 that extends around the bore 52. The bore 52 includes a longitudinal axis 56. The bore 52 is sized and shaped to receive the shaft 34. When the shaft 34 is extended through the bore 52, the axis 40 extends collinear with the longitudinal axis 56.

The opening 50 forms part of a bore 58 that extends substantially horizontally through the housing 14 to an opening 60 formed in a back surface 62 of the housing 14. The bore 58 includes a longitudinal axis 64. The bore 58 is sized and shaped to receive the user-operated button 42. The longitudinal axis 64 of the bore 58 extends orthogonal to the longitudinal axis 56 of the bore 52. The bore 58 is positioned such that part of the bore 58 intersects the bore 52.

Referring back to FIG. 3, a locking mechanism 46 includes a lower sleeve 66. An upper sleeve 68 is configured to engage the lower sleeve 66. The lower sleeve 66 is secured to the bottom surface 30 of the housing 14 with the illustrated fasteners 72. In some embodiments, other fasteners may be utilized to secure the lower sleeve 66 to the housing 14. The lower sleeve 66 includes a body 74 having a top surface 76 and a bottom surface 78. An opening 80 is formed in the top surface 76. A passageway 82 extends through the body 74 from the opening 80 to an opening (not shown) formed in the bottom surface 78. When the lower sleeve 66 is coupled to the housing 14, the passageway 82 extends along the longitudinal axis 56 of the bore 52. An annular platform 84 extends circumferentially around the opening 80 along the top surface 76. A plurality of curved grooves 86 are formed in the annular platform 84 circumferentially around the opening 80. The grooves 86 are generally concave in shape.

Figure 5:
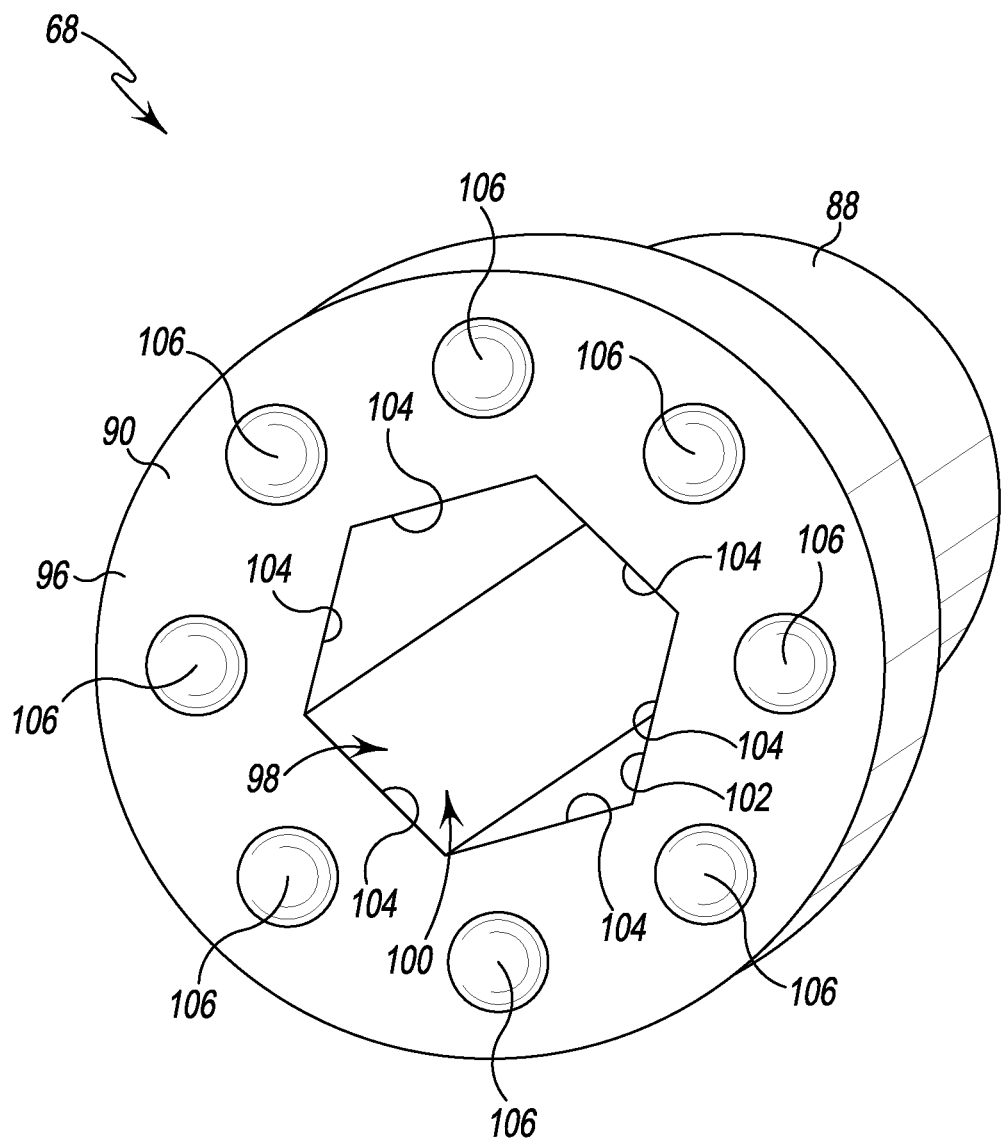
FIG. 5 is a bottom perspective view of an upper sleeve of the arm rest assembly shown in FIG. 3.

The upper sleeve 68 includes a body 88 and a flange 90 extending circumferentially around an end of the body 88. The body 88 includes a top surface 92 having an opening 94. Referring to FIG. 5, the flange 90 has a bottom surface 96 with an opening 98. An opposite top surface 97 (shown in FIG. 3) extends circumferentially around the body 88. A passageway 100 extends through the body 88 from the opening 94 to the opening 98. The upper sleeve 68 engages the housing 14, such that the passageway 100 extends along the longitudinal axis 56 of the bore 52. The passageway 100 includes an inner sidewall 102. The inner sidewall 102 is hexagonal in shaped and includes six linear sidewall segments 104. The bottom surface 96 of the flange 90 includes a plurality of curved pegs 106 formed circumferentially around the opening 98. The pegs 106 are convex in shape and extend outward from the flange 90. The pegs 106 are sized and shaped to correspond to the grooves 86 formed in the lower sleeve 66. That is, when upper sleeve 68 and the lower sleeve 66 are coupled to the housing 14, each of the pegs 106 is configured to be received in one of the grooves 86.

Referring back to FIG. 3, a biasing element configured as a spring 70 includes a lower end 108 and an upper end 110. A passageway 112 extends from the lower end 108 to the upper end 110. The spring 70 is sized to be positioned around the body 88 of the upper sleeve 68, such that the body 88 extends through the passageway 112 formed in the spring 70. The lower end 108 engages the top surface 97 of the flange 90 of the upper sleeve 68. The upper end 110 engages the inner surface 59 of the inner flange 57 of the housing 14. The spring 70 urges the upper sleeve 68 toward the lower sleeve 66, such that each of the pegs 106 is received in one of the grooves 86. A washer 114 may be positioned between the spring 70 and the inner surface 59 of the housing 14.

The shaft 34 is sized and shaped to be received within the bore 52 of the housing 14. The shaft 34 likewise extends through the passageway 82 of the lower sleeve 66 and the passageway 100 of the upper sleeve 68. The shaft 34 has a hexagonal outer sidewall 116 defined by six linear sidewall portions 118. The sidewall 116 of the shaft 34 is sized and shaped to correspond to the sidewall 102 of the upper sleeve 68. When the shaft 34 is inserted into the passageway 100 of the upper sleeve 68, the outer sidewall 116 of the shaft 34 is positioned flush with the inner sidewall 102 of the upper sleeve 68. Accordingly, when the shaft 34 is rotated, the upper sleeve 68 is likewise rotated. A plurality of annular slots 120 extend circumferentially around the shaft 34. In the illustrated embodiment, the shaft 34 includes three annular slots 120. The annular slots 120 include a substantially concave sidewall 122.

The upper sleeve 68 rotates relative to the lower sleeve 66. When the upper sleeve 68 rotates from a first angular position, the curved surface of each peg 106 engages the curved surface of the respective groove 86, such that the pegs 106 disengage from the respective groove and the upper sleeve 68 is urged upward to contract the spring 70. The pegs 106 then move along the annular platform 84 until each peg 106 is aligned with the next groove 86. The spring 70 urges the pegs 106 into engagement with the next respective groove 86 to lock the upper sleeve 68 in a second angular position. By way of example, in an assembly 10 having eight pegs 106 and grooves 86, the arm rest 16 is permitted to rotate 360 degrees between eight angular positions. In each position, the spring 70 urges the pegs 106 into the grooves 86 until rotational pressure is applied to the arm rest 16 to disengage the pegs 106 from the grooves 86.

The user-operated button 42 is sized and shaped to extend through the bore 58 of the housing 14. The user-operated button 42 includes a rod 124 and a cap 126 positioned on an end of the rod 124. The cap 126 is positioned on an end of the rod 124 opposite the end 43 that extends from the housing 14. The rod 124 is substantially cylindrical and includes a cylindrical outer sidewall 128. The cap 126 is likewise cylindrical and includes a cylindrical outer sidewall 130. The sidewall 130 of the cap 126 has a diameter that is greater than a diameter of the sidewall 128 of the rod 124. The sidewall 130 of the cap 126 is sized and shaped to correspond to the sidewalls 122 of the annular slots 120 of the shaft 34. A biasing element configured as a spring 132 is positioned between the cap 126 and the bracket 12. The spring 132 urges the user-operated button 42 into a locked position. In the locked position, the sidewall 130 of the cap 126 engages the sidewall 122 of an annular slot 120 of the shaft 34. The user-operated button 42 is operable to be moved into an unlocked position by applying pressure to the end 43. In the unlocked position the sidewall 130 of the cap 126 is disengaged from the sidewall 122 of the annular slot 120 of the shaft 34 such that the sidewall 128 of the rod 124 is aligned with the sidewall 122 of the annular slot 120. Because the sidewall 128 of the rod 124 has a smaller diameter than the sidewall 122 of the annular slot 120, the user-operated button 42 is disengaged from the shaft 34 in the unlocked position, thereby enabling vertical movement of the shaft 34.

Figure 6:
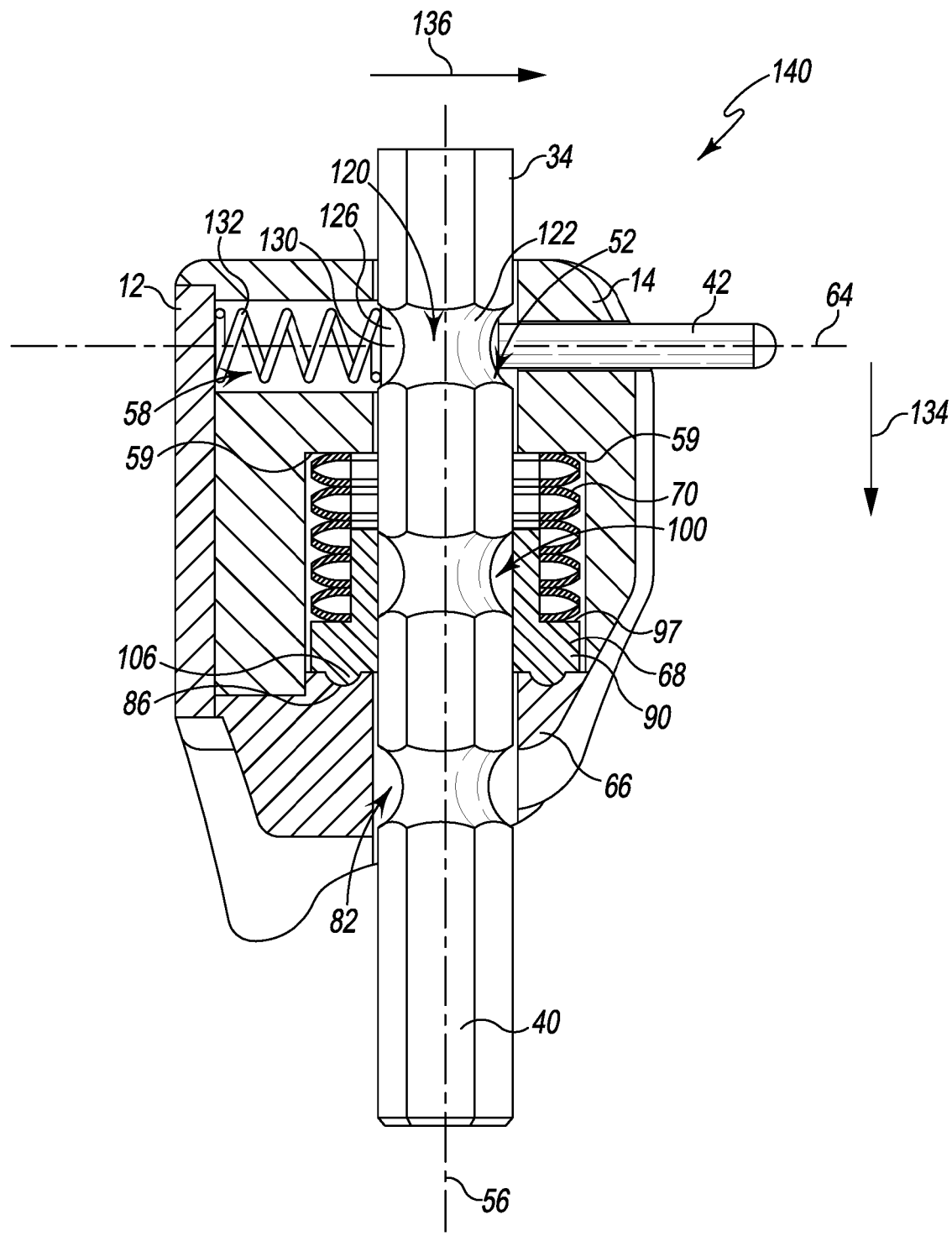
FIG. 6 is a cross-sectional view of the housing and locking mechanism shown in FIG. 3 illustrating the locking mechanism in a first angular position and the user-operated button in a locked position to retain the shaft at a first height.

Referring to FIG. 6, the shaft 34 extends through the bore 52 along the longitudinal axis 56 of the bore 52. The shaft 34 likewise extends through the passageway 100 of the upper sleeve 68 and the passageway 82 of the lower sleeve 66. The spring 70 urges the upper sleeve 68 toward the lower sleeve 66 in the direction of arrow 134 such that the pegs 106 are received in the grooves 86 of the lower sleeve 66. Each peg 106 is positioned within a groove 86 to limit movement of the upper sleeve 68 relative to the lower sleeve 66, thereby limiting rotational movement of the shaft 34 about the axis 40.

The user operated button 42 is positioned within the bore 58 and extends along the longitudinal axis 64 orthogonal to the longitudinal axis 56. The spring 132 urges the user operated button 42 in the direction of arrow 136 into the locked position 138. In the locked position, the end 43 of the user-operated button 42 extends from the housing 14, as illustrated in FIG. 6. In the locked position 138, the sidewall 130 of the cap 126 engages the sidewall 122 of an annular slot 120 of the shaft 34. Because the sidewall 130 of the cap 126 is sized and shaped to the sidewall 122 of the annular slot 120, the user operated button 42 limits vertical movement of the shaft 34 in the locked position 138.

Figure 7:
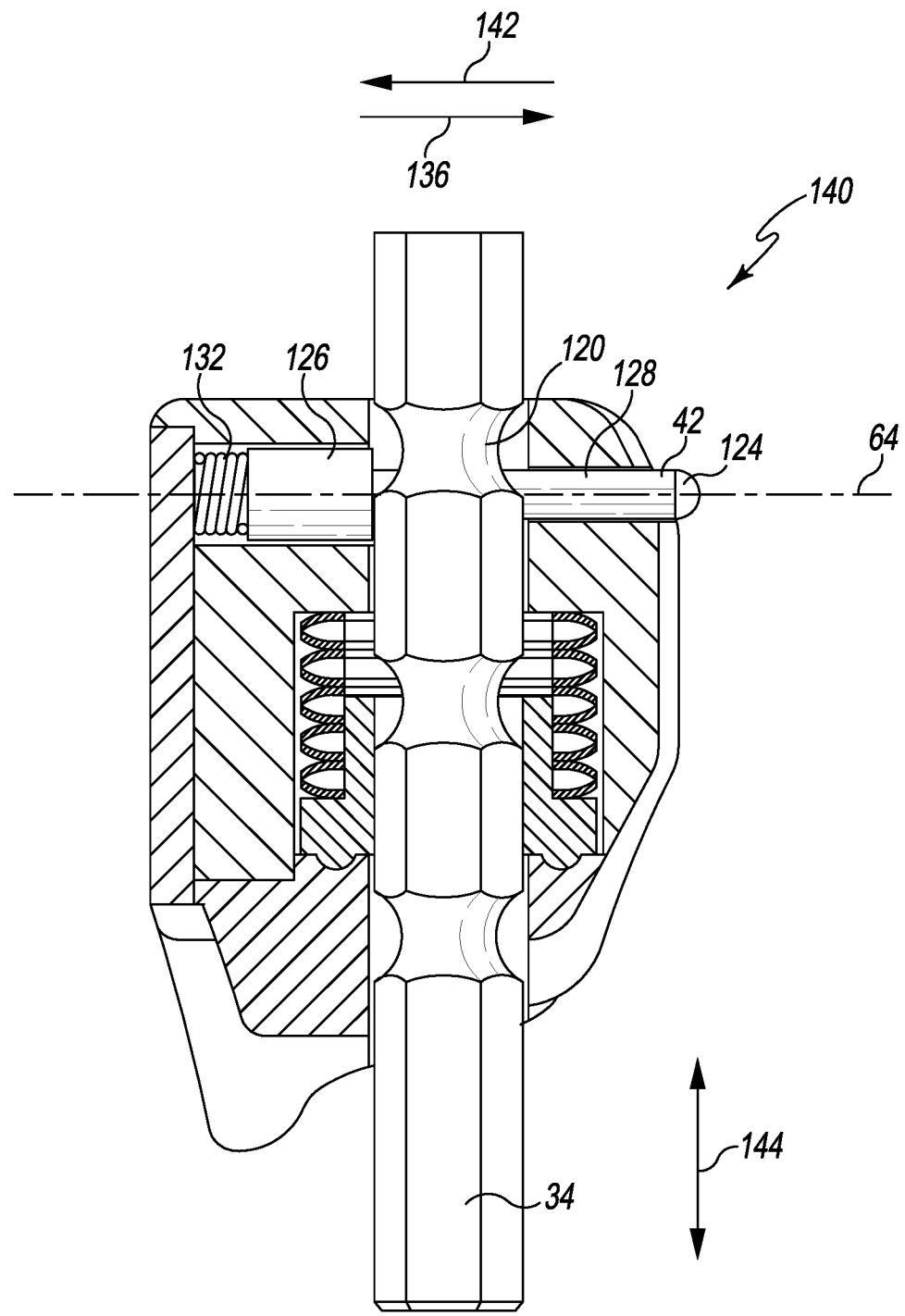
FIG. 7 is the cross-sectional view of the housing and locking mechanism shown in FIG. 6 illustrating the locking mechanism in the first angular position and the user-operated button in an unlocked position allowing vertical movement of the shaft.

Referring to FIG. 7, a user may press on the user operated button 42 in the direction of arrow 142 to move the button 42 to the unlocked position 140. The spring 132 is contracted such that the cap 126 of the user operated button 42 disengages the annular slot 120 of the shaft 34. In the unlocked position 140, the rod 124 is aligned with the annular slot 120 of the shaft 34. Because the sidewall 128 of the rod 124 is not sized and shaped to the sidewall 122 of the annular slot 120, the shaft 34 is free to move vertically to permit the user to adjust the height of the arm rest 16 relative to, for example, the seat of the motorcycle.

In the unlocked position 140, the user can move shaft 34 vertically upward or downward in the direction of arrow 144. After the user operated button 42 is released by the user, the spring 132 urges the user operated button 42 back in the direction of 136 to the locked position 138. Accordingly, the shaft 34, and consequently the arm rest 16 can be raised or lowered by the user until the cap 126 of the user operated button 42 is urged back into one of the annular slots 120. As such, the annular slots 120 define fixed heights for the arm rest 16. In the illustrative embodiment, the three annular slots 120 of the shaft 34 define three fixed locations to which the arm rest 16 may be raised or lowered. It should be noted that the shaft 34 may include any number of annular slots 120 defining a corresponding number of fixed locations to which the arm rest 16 can be raised or lowered.

Figure 8:
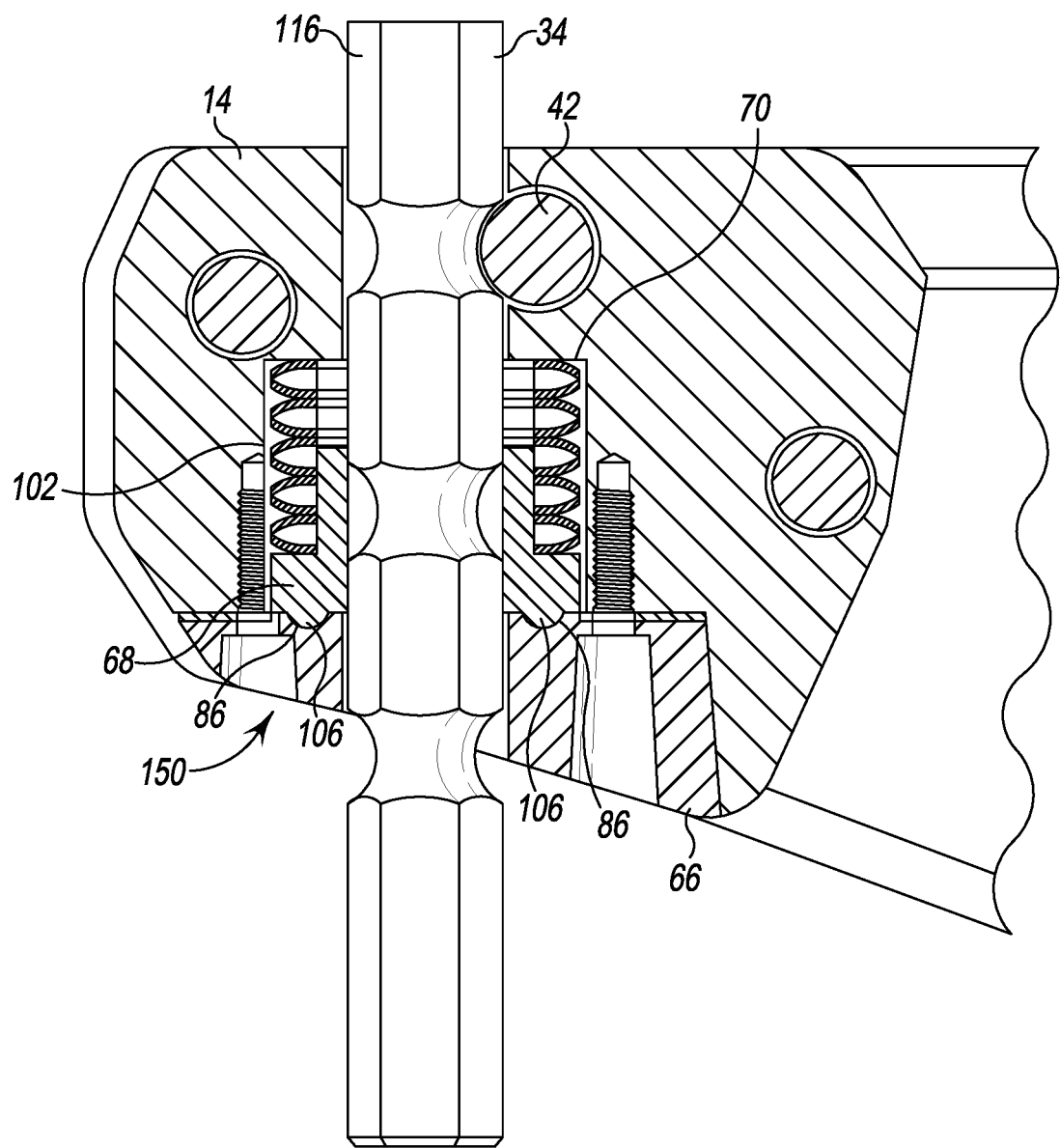
FIG. 8 is a cross-sectional view of the housing, locking mechanism, and user-operated button shown in FIG. 3 illustrating the user-operated button in the locked position and the locking mechanism and shaft in the first angular position.

Referring to FIG. 8, the user operated button 42 is illustrated in the locked position 138, thereby limiting the vertical movement of the shaft 34. The upper sleeve 68 is illustrated in a first angular position 150. In the first angular position the spring 70 urges the upper sleeve 68 into engagement with the lower sleeve 66 to limit rotational movement of the shaft 34. In the first angular position 150, each of the pegs 106 of the upper sleeve 68 are positioned within one of the grooves 86 of the lower sleeve 66. Engagement between the pegs 106 and the grooves 86 limit the rotational movement of the upper sleeve 68, and thereby limit the rotational movement of the shaft 34.

Figure 9:
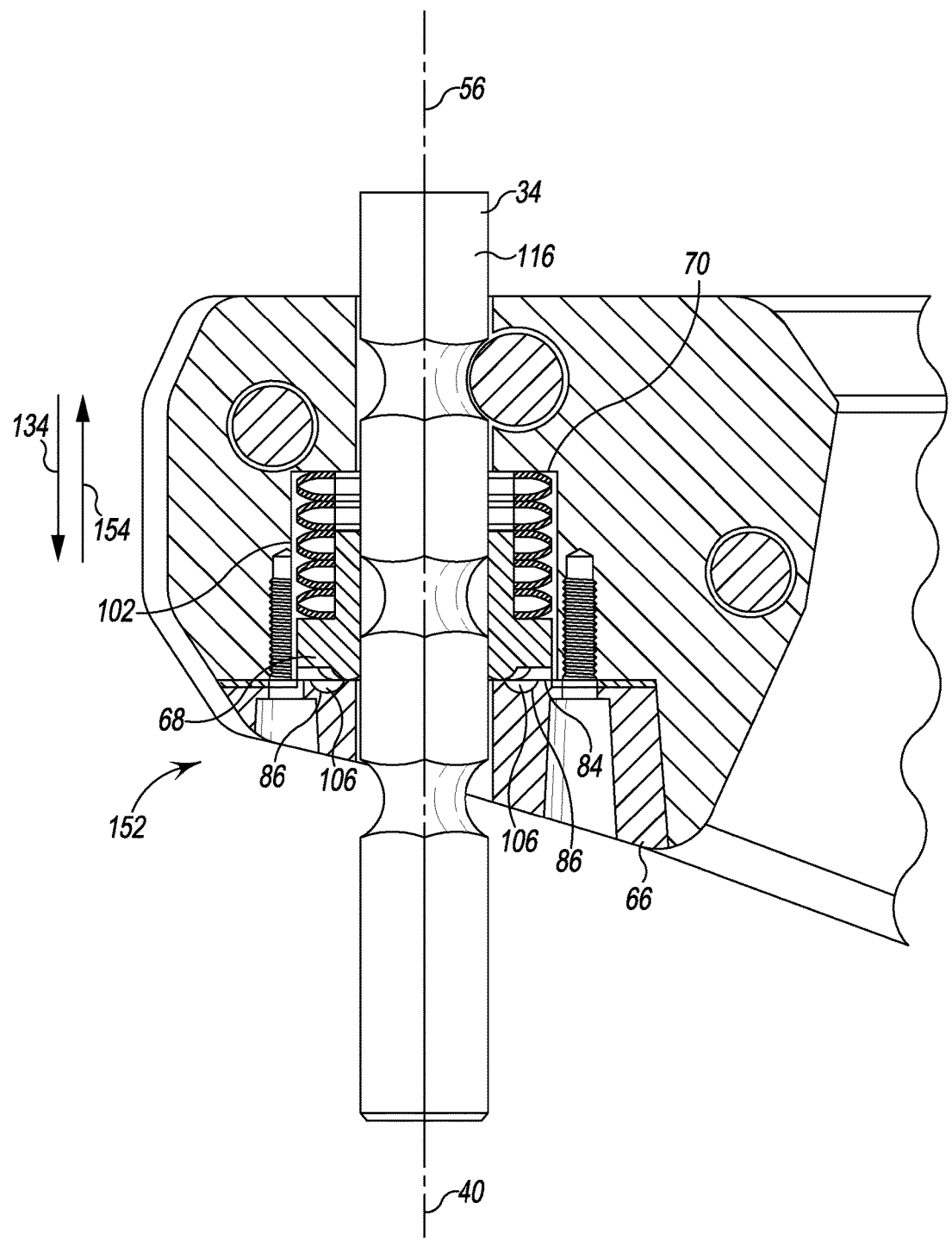
FIG. 9 is the cross-sectional view of the housing, locking mechanism, and user-operated button shown in FIG. 8 illustrating the user-operated button in the locked position and the locking mechanism and shaft in a second angular position.

In FIG. 9, the user rotates the shaft 34 about the axis 40 and the longitudinal axis 56 such that the upper sleeve 68 is in a second angular position 152. Generally, by applying rotational pressure to the arm rest 16, the shaft 34 begins to rotate. The outer sidewall 116 of the shaft 34 engages the inner sidewall 102 of the upper sleeve 68, thereby rotating the upper sleeve 68. During rotation, pressure between the pegs 106 and the annular platform 84 urges the spring 70 to contract in the direction of arrow 154, thereby allowing the pegs 106 to disengage the grooves 86. The upper sleeve 68 then rotates about the axis 40 until each peg 106 is aligned with the next groove 86 in the annular platform 84 at which time the spring 70 expands in the direction of 134 to urge the pegs 106 into the next respective grooves 86. The upper sleeve 68 is configured to rotate a full 360 degrees about the lower sleeve 66. Accordingly, applying rotational pressure to the arm rest 16 permits the arm rest 16 to rotate 360 with the arm rest 16 becoming locked at intermediate positions defined by the pegs 106 and the grooves 86.

Figure 10:
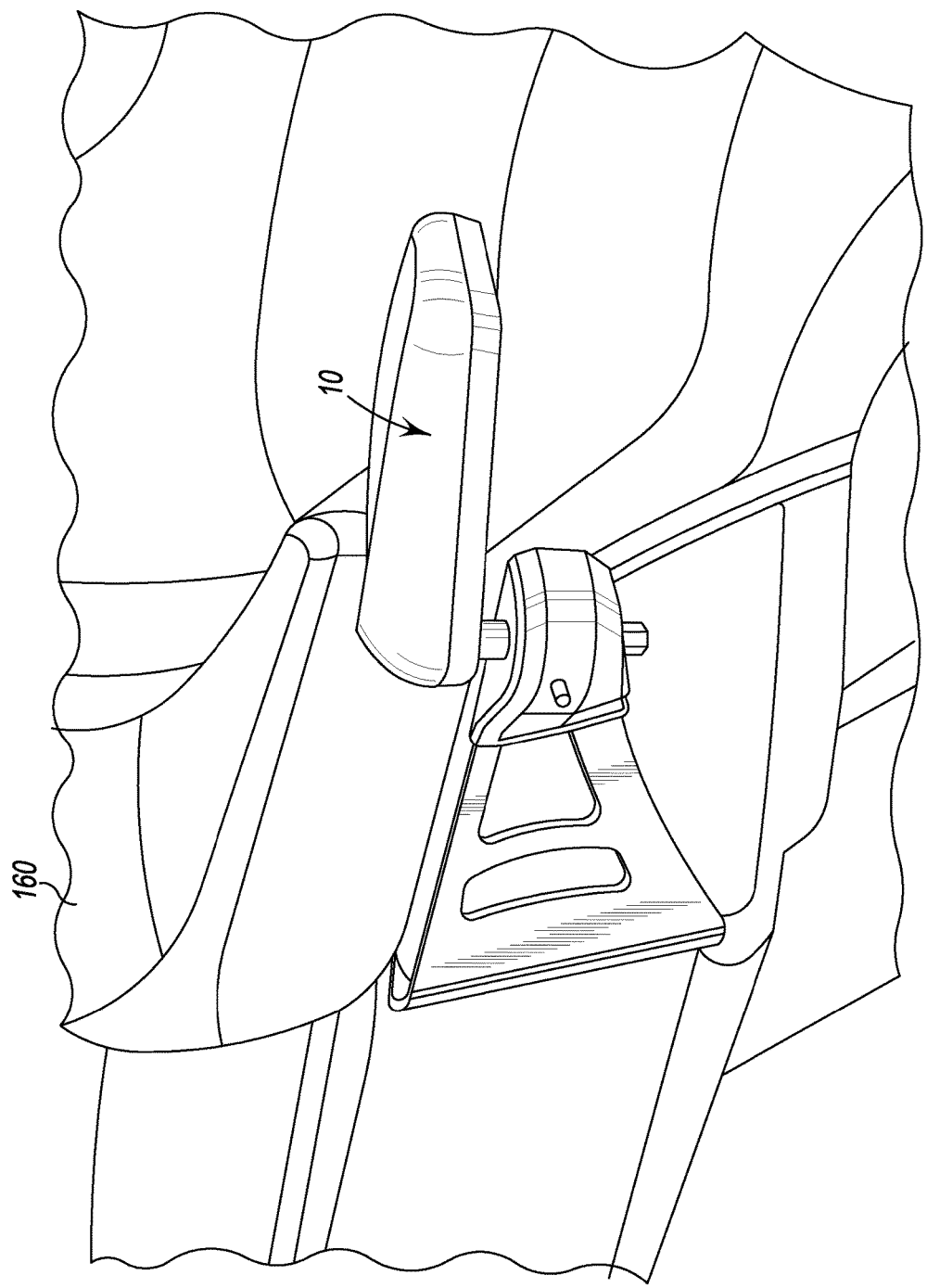
FIG. 10 is a perspective view of the arm rest assembly shown in FIG. 1 attached to a passenger seat of a motorcycle.

FIG. 10 illustrates the arm rest assembly 10 coupled to a back seat 160 of a motorcycle 162. The arm rest assembly 10 is configured to couple to a frame of the back seat 160 and extend forward toward a front (not shown) of the motorcycle 162, such that the arm rest 16 extends along a side of the back seat 160 toward the front of the motorcycle 162.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the devices and assemblies described herein. It will be noted that alternative embodiments of the devices and assemblies of the present disclosure may not include all of the features described yet still benefit from at least some of the advantages of such features. Those of ordinary skill in the art may readily devise their own implementations of the devices and assemblies that incorporate one or more of the features of the present invention and fall within the spirit and scope of the present disclosure as defined by the appended claims.

The invention claimed is:

1. An arm rest assembly for a motorcycle, comprising:
a support including an elongated body sized to receive an arm of a passenger, a shaft extending downwardly from the elongated body, and a plurality of annular slots defined in the shaft,
a housing including a bore sized to receive the shaft,
a user-operated button positioned in the housing, the user-operated button being movable between a first position in which the button is received in a first annular slot of the plurality of annular slots to prevent vertical movement of the support relative to the housing, and a second position in which the button is spaced apart from the first annular slot to permit vertical movement of the support,
a first sleeve secured to the housing, the first sleeve having a first passageway extending along a longitudinal axis and sized to receive the elongated shaft, a second sleeve including a body that is pivotally coupled to the housing and a second passageway that is defined in the body and is sized to receive the elongated shaft, and a locking mechanism operable to secure the second sleeve to the first sleeve to prevent relative movement between the first sleeve and the second sleeve, wherein the locking mechanism includes a groove defined in the first sleeve and a peg extending from the body of the second sleeve that is sized to be received in the groove.

2. The arm rest assembly of claim 1, wherein:

the groove includes a plurality of grooves positioned circumferentially around the first passageway of the first sleeve, and the peg includes a plurality of pegs positioned circumferentially around the second passageway of the second sleeve, each peg being sized to be received in one of the plurality of grooves to prevent relative movement between the first sleeve and the second sleeve.

3. The arm rest assembly of claim 2, wherein:

a concave curved surface defines each groove of the plurality of grooves of the first sleeve, and each peg of the second sleeve includes a convex curved surface.

4. The arm rest assembly of claim 1, wherein the locking mechanism includes a biasing element positioned between the second sleeve and the housing to bias the second sleeve into engagement with the first sleeve such that the peg is positioned in the groove.

5. The arm rest assembly of claim 1, wherein:

the shaft includes a hexagonal outer wall, and the second sleeve includes a hexagonal inner wall shaped to match the hexagonal outer wall of the shaft.

6. The arm rest assembly of claim 1, wherein the user-operated button includes:

a cap positioned in the housing and sized to be received in each annular slot of the shaft, and a rod having a first end connected to the cap and a second end positioned outside of the housing.

7. The arm rest assembly of claim 6, further comprising a biasing element that biases the user-operated button in the first position.

8. The arm rest assembly of claim 6, wherein the user-operated button is moveable along an axis extending orthogonal to the longitudinal axis of the first sleeve.

9. The arm rest assembly of claim 6, wherein:

the cap includes a cylindrical outer surface, and the shaft includes a concave curved surface defining each annular slot of the plurality of annular slots.

10. The arm rest assembly of claim 1, further comprising a bracket configured to be coupled to the motorcycle, wherein the housing is secured to a distal end of the bracket.

11. The arm rest of claim 1, wherein the shaft includes only three annular slots.

12. An arm rest assembly for a motorcycle, comprising:

a support including an elongated body sized to receive an arm of a passenger, and a shaft extending downwardly from the elongated body, a housing including a bore sized to receive the shaft, a first sleeve secured to the housing, the first sleeve having a first passageway extending along a longitudinal axis and sized to receive the elongated shaft, a second sleeve including a body that is pivotally coupled to the housing and a second passageway that is defined in the body and is sized to receive the elongated shaft, a locking mechanism operable to secure the second sleeve to the first sleeve to prevent relative movement between the first sleeve and the second sleeve, wherein the locking mechanism includes a plurality of grooves positioned circumferentially around the first passageway of the first sleeve and a plurality of pegs positioned circumferentially around the second passageway of the second sleeve, each peg being sized to be received in one of the plurality of grooves, and a biasing element positioned between the second sleeve and the housing to bias the second sleeve into engagement with the first sleeve such that the each peg is received in one of the plurality of grooves to prevent relative movement between the first sleeve and the second sleeve.

13. The arm rest assembly of claim 12, wherein:

a concave curved surface defines each groove of the plurality of grooves of the first sleeve, and each peg of the second sleeve includes a convex curved surface.

14. The arm rest assembly of claim 12, wherein:

the shaft includes a hexagonal outer wall, and the second sleeve includes a hexagonal inner wall shaped to match the hexagonal outer wall of the shaft.

15. The arm rest assembly of claim 12, further comprising:

a plurality of annular slots defined in the shaft, and a user-operated button positioned in the housing, the user-operated button being movable between a first position in which the button is received in a first annular slot of the plurality of annular slots to prevent vertical movement of the support relative to the housing, and a second position in which the button is spaced apart from the first annular slot to permit vertical movement of the support, and a biasing element that biases the user-operated button in the first position.

16. The arm rest assembly of claim 15, wherein the user-operated button includes:

a cap positioned in the housing and sized to be received in each annular slot of the shaft, and a rod having a first end connected to the cap and a second end positioned outside of the housing.

17. The arm rest assembly of claim 15, wherein the user-operated button is moveable along an axis extending orthogonal to the longitudinal axis of the first sleeve.

18. A method of operating an arm rest assembly, comprising:

biasing a user-operated button positioned within a housing of the armrest assembly to first position in which the button is received in a first annular slot of a plurality of annular slots of a shaft extending through a bore in the housing to prevent vertical movement of the shaft relative to the housing and relative to a first sleeve secured to the housing and having a first passageway through which the shaft extends, advancing the user operated button to a second position in which the button is spaced apart from the first annular slot to permit vertical movement of the shaft relative to the housing and the first sleeve, expanding a biasing element to bias a second sleeve that is pivotally coupled to the housing and has a second passageway through which the shaft extends such that each of a peg of the second sleeve is received in a groove defined in the first sleeve to prevent relative movement between the first sleeve and the second sleeve, and contracting the biasing element to disengage the peg from the groove to allow relative movement between the first sleeve and the second sleeve, wherein shaft rotates with the second sleeve.

19. The method of claim 18, further comprising advancing the user-operated button along an axis extending orthogonal to a longitudinal axis of the first sleeve.

20. The method of claim 18 further comprising biasing a convex curved surface of the peg into a concave surface of the groove.

* * * * *